United States Patent
Yu et al.

(10) Patent No.: US 8,831,274 B2
(45) Date of Patent: Sep. 9, 2014

(54) APPLICATION PROGRAM EXECUTION METHOD

(75) Inventors: Hong-Chi Yu, Kaohsiung (TW); Mao-Ting Chang, Kaohsiung (TW)

(73) Assignee: Walton Advanced Engineering Inc., Kaohsiung (TW)

( * ) Notice: Subject to any disclaimer, the term of this patent is extended or adjusted under 35 U.S.C. 154(b) by 193 days.

(21) Appl. No.: 13/480,525

(22) Filed: May 25, 2012

(65) Prior Publication Data

US 2013/0259293 A1    Oct. 3, 2013

(30) Foreign Application Priority Data

Mar. 28, 2012  (TW) .............................. 101110712 A

(51) Int. Cl.
*G06K 9/00*         (2006.01)

(52) U.S. Cl.
USPC ......................................................... 382/100

(58) Field of Classification Search
USPC ................................................. 382/100, 307
See application file for complete search history.

(56) References Cited

U.S. PATENT DOCUMENTS 6,816,882 B1 *  11/2004  Conner et al. ................ 709/203
2009/0285484 A1 *  11/2009  Mallinson et al. ............ 382/183

* cited by examiner

*Primary Examiner* — Yon Couso
(74) *Attorney, Agent, or Firm* — Bacon & Thomas, PLLC

(57) ABSTRACT

The present invention relates to an application program execution method which allows information held in an image to be analyzed by means of a mobile device's image recognition function, depends on specific content of information held in the image to call a corresponding application program, and complete an execution. The information held in the image comprises the application program's exclusive username, password and connecting mode, for instance, a web hard drive, network video, or a decoding key.

11 Claims, 6 Drawing Sheets

```
┌─────────────────────────────────────────────────────┐
│ The recognition software (10) is executed in the    │ ─ 601
│ customer premise equipment (30) to capture an       │
│ image (40).                                         │
└─────────────────────────────────────────────────────┘
                          │
                          ▼
┌─────────────────────────────────────────────────────┐
│ a matching module (11) of the recognition software  │ ─ 602
│ (10) analyzes the information (41) of the image     │
│ (40) and judges which application program (20) is   │
│ suitable to open the information (41).              │
└─────────────────────────────────────────────────────┘
                          │
                          ▼
┌─────────────────────────────────────────────────────┐
│ The corresponding application program (20) is       │ ─ 603
│ called and executed by the recognition software     │
│ (10) to set the information (41) into the customer  │
│ premise equipment (30).                             │
└─────────────────────────────────────────────────────┘
                          │
                          ▼
┌─────────────────────────────────────────────────────┐
│ An account setting for the information (41) is      │ ─ 604
│ captured by the application program (20) to link a  │
│ server (50) via Internet and catch a file list (51).│
└─────────────────────────────────────────────────────┘
```

APPLICATION PROGRAM EXECUTION METHOD

BACKGROUND OF THE INVENTION

1) Field of the Invention

The present invention provides an interactive application program method which depends on image recognition to analyze a source image and information held in the analyzed image to activate corresponding application software and access the information.

2) Description of the Prior Art

Based on humanistic demands for present software design, the supreme principle of simple and fast ready-to-hand operation should be available to a conventional computer's operating system or any application software. To match users' future requirements, more and more current software platforms have linked remote servers known as Cloud Computing, an Internet-based computing method by which shared software/hardware resources or messages can be offered to computers and other equipment according to demands.

As the first priority, a fundamental principle to consider a user's experience is always applicable to both conventional local operated software and Cloud Computing software. A user's experience can be divided into the user's first experience to operate software and next perception for fluency during operations. A user's first experience in software usually belongs to intuitive operations rather than complex operations completed through various options on an interface which disturb first operations and need to be minimized. A user's next experience focuses on software's stability and conformity which should be clearly defined during software design.

Prevalent mobile equipment followed by fast developed and convenient mobile Internet and Cloud Computing has made regular requirements for mobile equipment very frequent. However, it is still uneasy to complete setup within mobile equipment's limited space in which an input of a site URL, a username or a password may particularly trouble a user.

In addition to the above descriptions, to store information such as site URL, username and password simply and fast is still an obvious problem. Furthermore, it is difficult to transfer either a password to unlock a game or exclusive software between conventional media.

SUMMARY OF THE INVENTION

To solve the above problems, the present invention provides an application program execution method comprising recognition software, application program and customer premise equipment wherein both the recognition software and the application program are installed in the customer premise equipment and the application program depends on the recognition software to execute corresponding actions and minimize problems common in conventional information exchanges.

Accordingly, the object of the present invention is to provide an application program execution method featuring a simple operating procedure with no username or password entered by fingers.

The other object of the present invention is to provide an application program execution method featuring an easy procedure to unlock software which simplifies an operating procedure by entering an unlock code via a cell phone.

The further object of the present invention is to provide an application program execution method reinforcing information security by means of an image to transmit information.

The yet other object of the present invention is to provide an application program execution method which depends on recognition software to analyze information held in an image and give a hint for corresponding software.

The yet still other object of the present invention is to provide an application program execution method which depends on recognition software to analyze information held in an image and opens the information by corresponding software.

The yet still further other object of the present invention is to provide an application program execution method which first depends on recognition software to analyze information held in an image and realizes a connection to a cloud file system with the information used by the application program.

The yet still further other object of the present invention is to provide an application program execution method which depends on recognition software to analyze information held in an image and realizes a connection to a webcam system with the information used by the application program.

In order to realize the above objects, the present invention applies the following technical measures as its major method. The present invention is an application program execution method which is called by a mobile device via image recognition and application program and comprises recognition software, application program and customer premise equipment wherein both the recognition software and the application program are installed in the customer premise equipment and the application program depends on the recognition software to execute corresponding actions with steps shown as follows: (a) The recognition software is executed in the customer premise equipment to capture an image; (b) a matching module of the recognition software analyzes the information of the image and judges which application program is suitable to open the information; (c) the application program is called and executed by the recognition software used to make the information to be accessed and set to and displayed on the customer premise equipment.

The objects and technical issues with respect to the present invention can be further embodied with the following technical measures.

In the abovementioned application program execution method, the application program can be multimedia viewer software, network application program, entertainment software or productivity software.

In the abovementioned application program execution method, the customer premise equipment can be each of devices such as cell phone, tablet personal computer, laptop computer and wrist watch.

In the abovementioned application program execution method, the customer premise equipment comprises at least a lens.

In the abovementioned application program execution method, the application program will catch an account setting held in the information to link a server via Internet and obtain video information after Step c.

In the abovementioned application program execution method, the application program will catch a key held in the information to add at least a new corresponding function into the application program after Step c.

In the abovementioned application program execution method, the application program will catch an account setting held in the information to link a server via Internet and obtain a file list after Step c.

In the abovementioned application program execution method, the application program comprises an account management module.

In the abovementioned application program execution method, the application program comprises a user interface and a synchronizing module.

In the abovementioned application program execution method, the application program comprises an off-line module.

In contrast to prior arts, the present invention is effective in: (1) fast setup of application program by means of image recognition; (2) software unlocked by a customer's exclusive image-based function; (3) login of cloud storage space based on image decoding; (4) login of remote video based on image decoding; (5) application program affirmed and activated by information passing image recognition; (6) high information security for access and storage of information based on image recognition.

BRIEF DESCRIPTIONS OF THE DRAWINGS

DETAILED DESCRIPTIONS OF THE PREFERRED EMBODIMENTS

Figure 1:
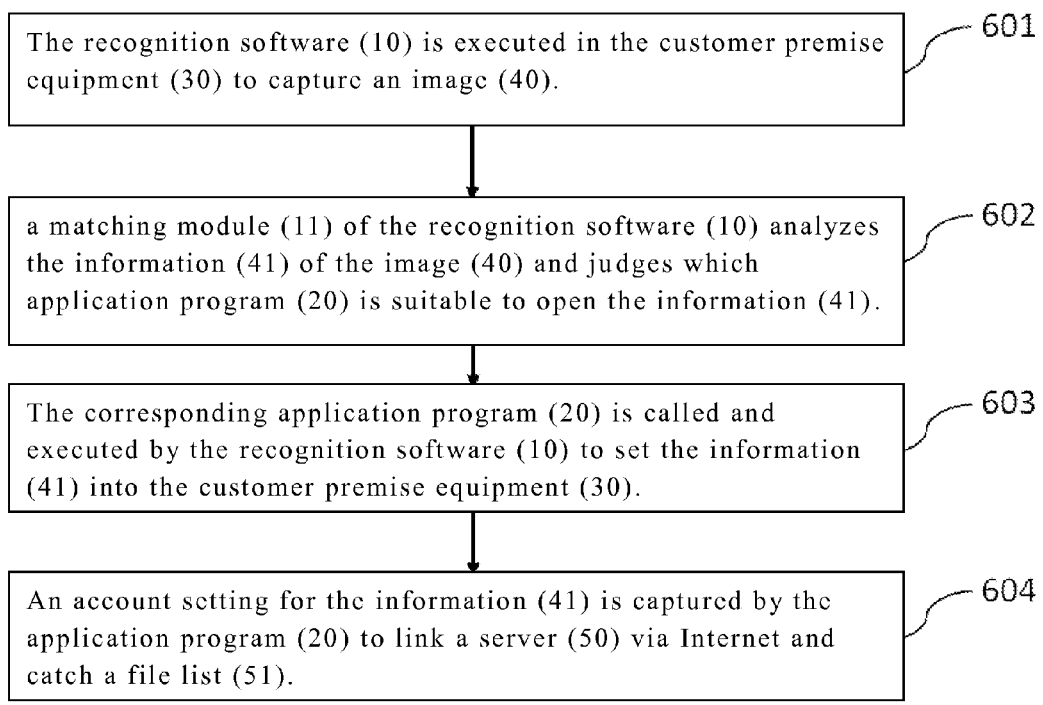
FIG. 1 is a flow diagram for the first embodiment of the present invention of an application program execution method.
Figure 2:
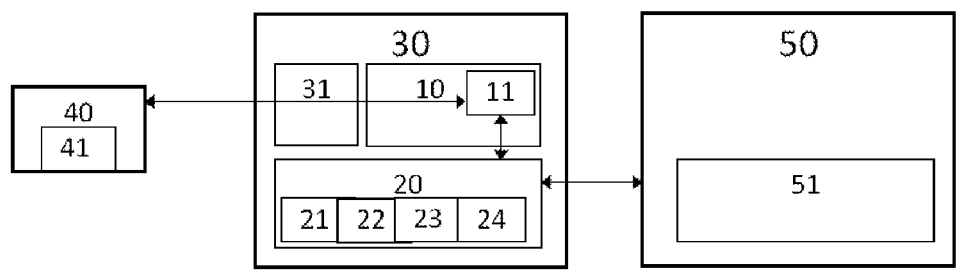
FIG. 2 is a block diagram for the first embodiment of the present invention.
Figure 3:
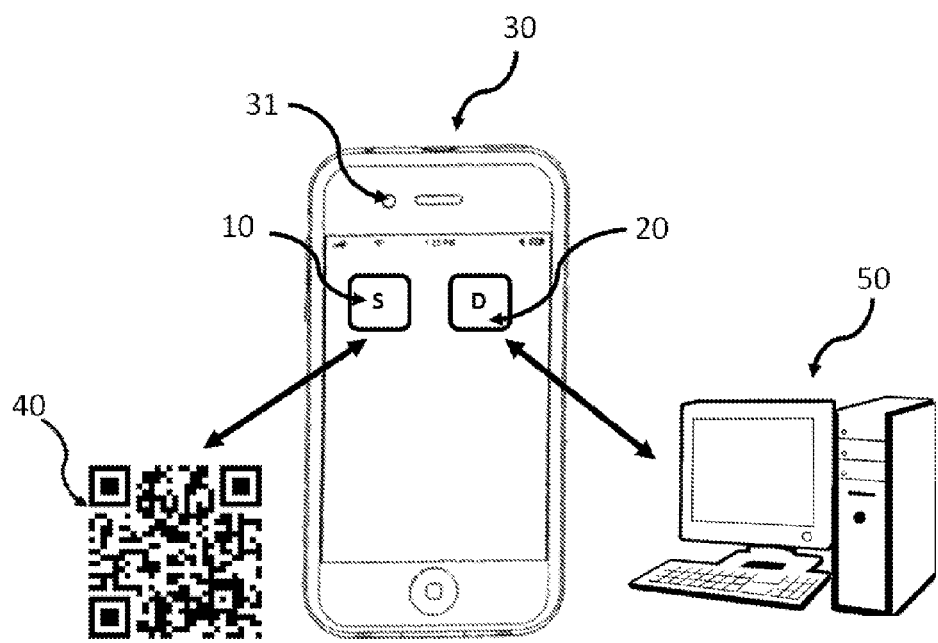
FIG. 3 is a schematic illustration for the first/second embodiments of using the present invention.

For objects, characteristics and effects obviously and easily understood, the preferred embodiments for the present invention are particularly interpreted as follows:

The first embodiment for the present invention of an application program execution method is shown from FIG. 1 to FIG. 3. Referring to FIG. 3 which illustrates the present invention is called by a mobile device through image recognition and application program and comprises recognition software (10), application program (20) and customer premise equipment (30) wherein both the recognition software (10) and the application program (20) are installed in the customer premise equipment (30) and the application program (20) depends on a matching module (11) of the recognition software (10) analyzing the information (41) of the image (40) to execute corresponding actions.

Referring to FIGS. 1 and 2 which illustrate steps as follows: (a) the recognition software (10) is executed in the customer premise equipment (30) and an image (40) is shot by a lens (31) on the customer premise equipment (30) (Step a: 601); (b) a matching module (11) of the recognition software (10) analyzes the information (41) of the image (40) and judges which application program (20) is suitable to open the information (41) (Step b: 602); (c) the corresponding application program (20) is called and executed by the recognition software (10) to set the information (41) into the application program (20) in the customer premise equipment (30) (Step c: 603); (d) an account setting for the information (41) is captured by the application program (20) to link a server (50) via Internet and catch a file list (51) (Step d1: 604).

Specifically, the recognition software (10) is image processing software with the following features: (a) catch image-related information by reading or capturing an image; (b) command its matching module (11) to obtain information held in the original image through algorithms for positioning, deformation and calibration; (c) analyze encoded contents to affirm a method or software for decoding; (d) depend on status of specific application program (20) installed in the customer premise equipment (30) to give a hint for installing or activating the application program (20) and complete a procedure of processing the image. The application program (20) is remote file management software which accesses the remote server (50) via Internet and catches the file list (51) stored in the server (50). In the embodiment, the customer premise equipment (30) can be each of the following devices such as cell phone, tablet personal computer, laptop computer and wrist watch and its lens (31) is installed on a control surface of the customer premise equipment (30) or the reverse side of the control surface. The server (50) is a management resource offering services to users and hardware equipment provided with computing power.

Preferably, the application program (20) comprises an account management module (21), a user interface (22), a synchronizing module (23) and an off-line module (24): (a) the account management module (21) manages settings held in information (41) previously acquired in order to call required historical records; (b) the user interface (22) is a user-friendly graphic interface on which there are icons and menus displaying various operating functions and the file list (51) and is able to reproduce, delete, modify and share remote files; (c) the synchronizing module (23) is effective in reproducing files saved in a remote server to the customer premise equipment (30) according to the file list (51) and updating files in the remote server by operations on the user interface (22) such as copy, deletion, modification and sharing; (d) the off-line module (24) supports the synchronizing module (23) to access files which have been saved in the customer premise equipment (30) by the synchronizing module (23) when the customer premise equipment (30) fails to link the server (50).

Figure 4:
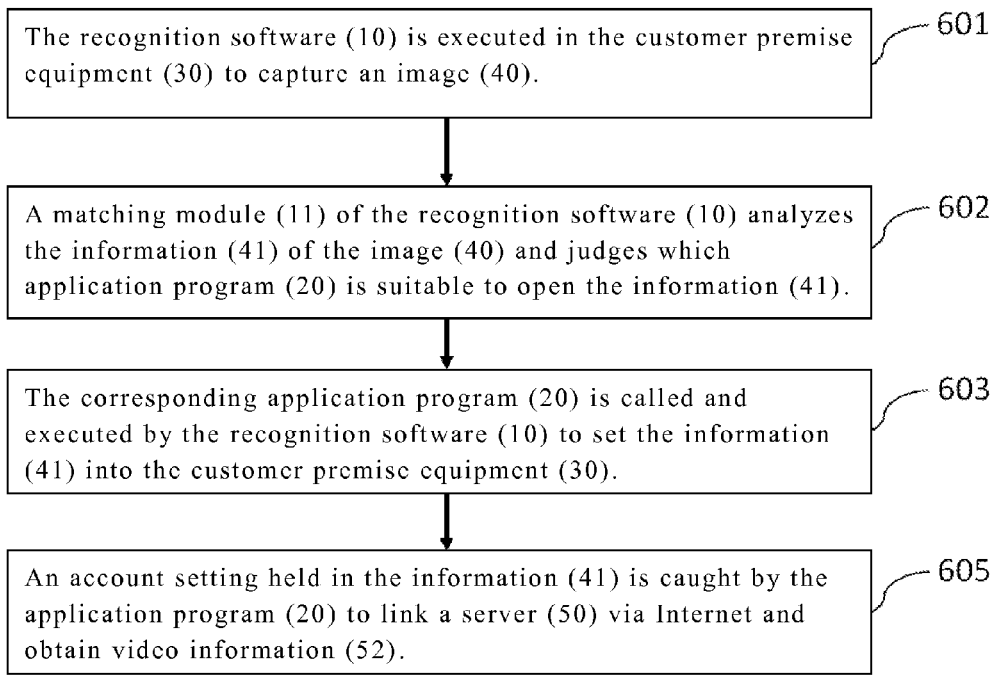
FIG. 4 is a flow diagram for the second embodiment of the present invention of an application program execution method.
Figure 5:
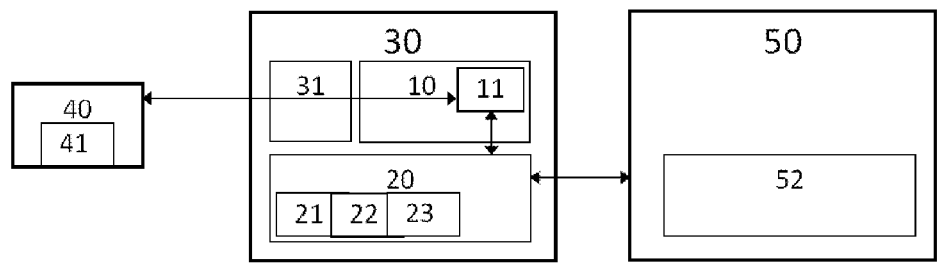
FIG. 5 is a block diagram for the second embodiment of the present invention.

Referring to FIGS. 3, 4 and 5 which illustrate the second embodiment for the present invention of an application program execution method wherein features described in the first embodiment (FIG. 1 to FIG. 3) are labeled with same symbols and not repeatedly explained. The main difference between the second embodiment and the first embodiment is that the application program (20) hereinafter is remote multimedia viewer software by which the remote digital image information can be checked via Internet.

Referring to the flow diagram in FIG. 4, the block diagram in FIG. 5 and the schematic illustration in FIG. 3: (a) the recognition software (10) is executed in the customer premise equipment (30) and an image (40) is shot by the lens (31) on the customer premise equipment (30) (Step a: 601); (b) a matching module (11) of the recognition software (10) analyzes the information (41) of the image (40) and judges which application program (20) is suitable to open the information (41) (Step b: 602); (c) the corresponding application program

(20) is called and executed by the recognition software (10) to set the information (41) into the application program (20) in the customer premise equipment (30) (Step c: 603); (d) an account setting held in the information (41) is caught by the application program (20) to link a server (50) via Internet and obtain video information (52) (Step d2: 605).

Specifically, the application program (20) is remote multimedia viewer software by which remote digital image information can be checked via Internet. The server (50) is a management resource offering services to users and hardware equipment provided with computing power. The video information (52) is one type of instantly encoded digital image information which is obtained from image/video equipment in the remote server (50) or saved in the remote server (50).

Preferably, the application program (20) comprises an account management module (21), a user interface (22) and a synchronizing module (23): (a) the account management module (21) manages settings held in information (41) previously acquired in order to call required historical records; (b) the user interface (22) is a user-friendly graphic interface on which there are icons and menus displaying various operating functions and the remote video information (52) that can be watched, recorded and shared; (c) the synchronizing module (23) is effective in transferring remote video information (52) to the customer premise equipment (30) according to packet/streaming media transmitted via Internet and completing corresponding operations such as video watching, recording and sharing via the user interface (22).

Referring to FIGS. 6, 7a, 7b, 8a and 8b which illustrate the third embodiment of the present invention of an application program execution method wherein features described in the first/second embodiments (FIG. 1 to FIG. 5) are labeled with same symbols and not repeatedly explained. The main difference between the third embodiment and the first/second embodiments is a new function (25) based on the information (41) can be added into application program (20).

Figure 6:
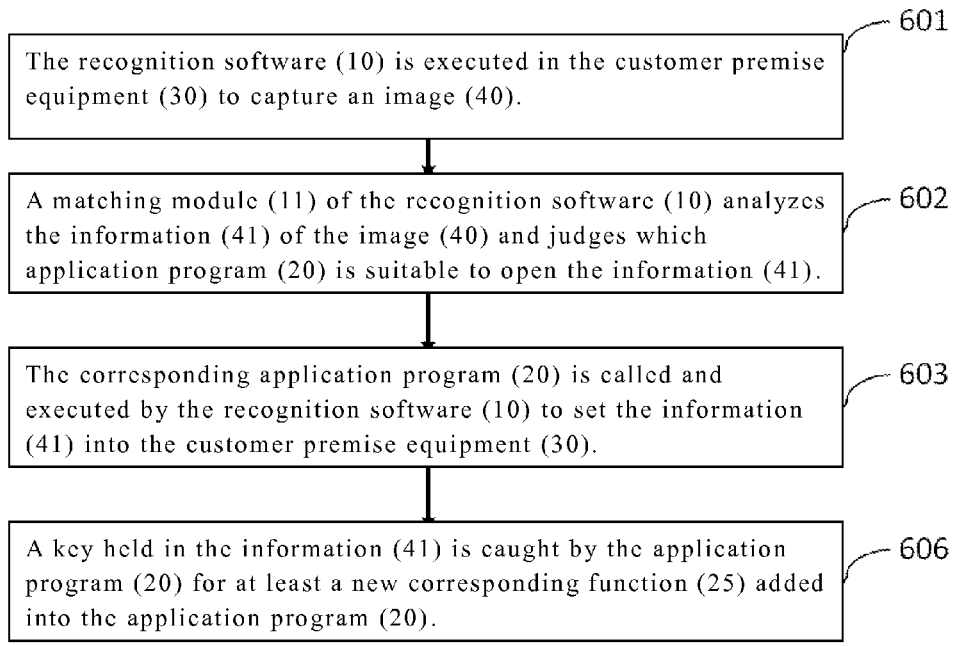
FIG. 6 is a flow diagram for the third embodiment of the present invention of an application program execution method.
Figure 7A:
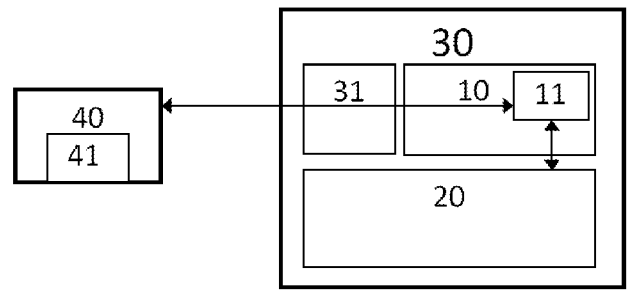
FIG. 7a is a first block diagram for the third embodiment of the present invention.
Figure 7B:
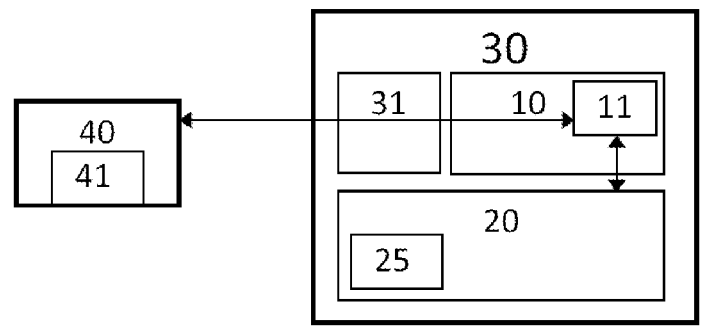
FIG. 7b is a second block diagram for the third embodiment of the present invention.
Figure 8A:
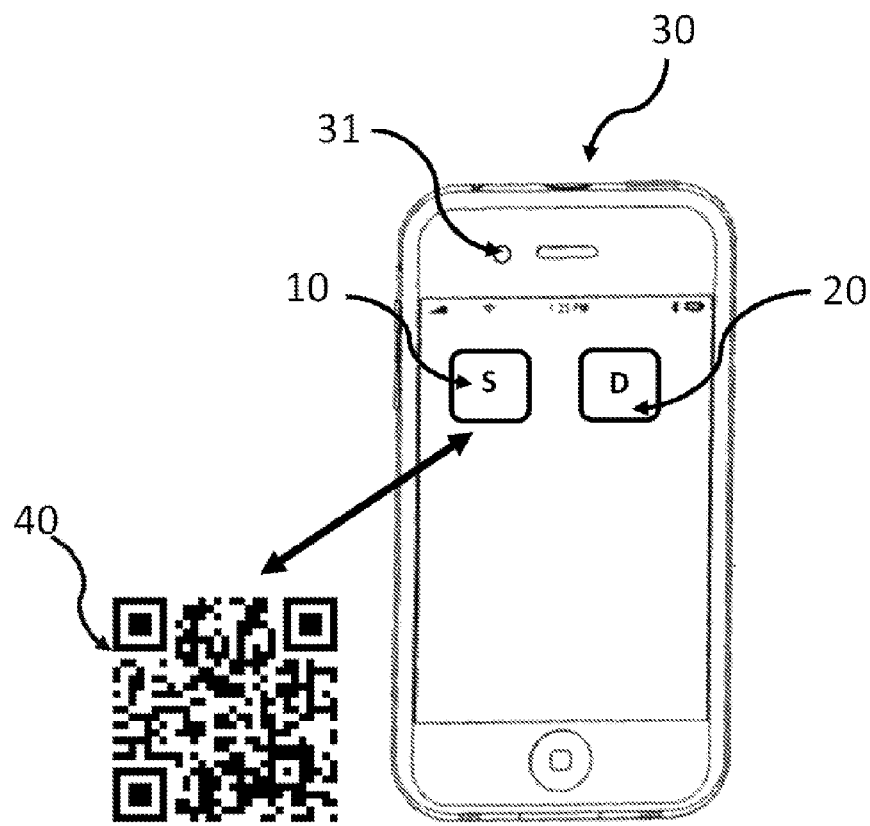
FIG. 8a is a schematic illustration for the first pattern in the third embodiment of the present invention.
Figure 8B:
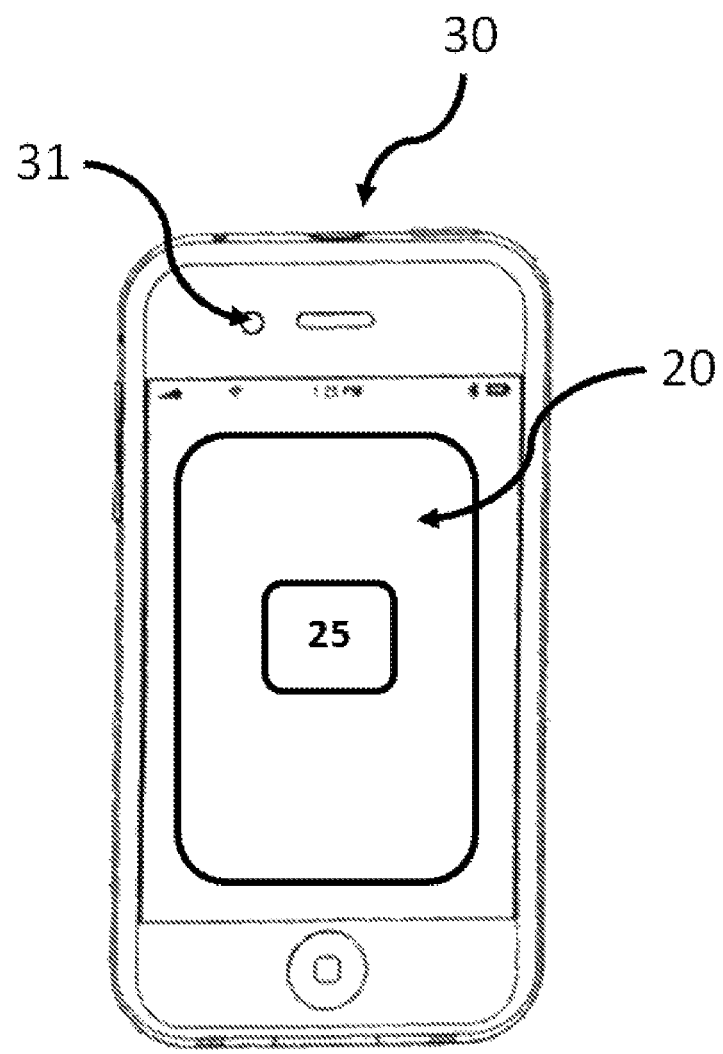
FIG. 8b is a schematic illustration for the second pattern in the third embodiment of the present invention.

Referring to FIGS. 6, 7a and 8a which illustrate steps as follows: (a) the recognition software (10) is executed in the customer premise equipment (30) and an image (40) is shot by the lens (31) on the customer premise equipment (30) (Step a: 601); (b) a matching module (11) of the recognition software (10) analyzes the information (41) of the image (40) and judges which application program (20) is suitable to open the information (41) (Step b: 602); (c) the corresponding application program (20) is called and executed by the recognition software (10) used to make the information (41) to be accessed by the application program (20) in the customer premise equipment (30) (Step c: 603); (d) a key held in the information (41) is caught by the application program (20) for at least a new corresponding function (25) added into the application program (20) (FIGS. 7b and 8b) (Step d3: 606).

Specifically, the application program (20) can be multimedia viewer software, network application software, entertainment software or productivity software. The function (25) which is originally embedded in source codes of the application program (20) will be displayed on one interface of the application program (20) after the key held in the information (41) is caught. Or, the function (25) which is not embedded in source codes of the application program (20) will be manually or automatically downloaded from Internet by a hint and completely added after the key held in the information (41) is caught.

As a result, the present invention with some effects different from an alternative application program execution method and referred to as creative work due to a call of application program meets patentability and is applied for the patent.

It must be stressed that the above disclosures demonstrate the preferred embodiments of the present invention only and any equivalent change in patent specifications, claims or drawings with respect to the present invention is still within the technical scope protected by the present invention which refers to claims hereinafter.

What is claimed is:

1. An application program execution method which is called by a mobile device based on image recognition and application program comprises recognition software (10), application program (20) and customer premise equipment (30) wherein both the recognition software (10) and the application program (20) are installed in the customer premise equipment (30) and the application program (20) depends on the recognition software (10) to execute corresponding actions with steps shown as follows:
  a. the recognition software (10) is executed in the customer premise equipment (30) to capture an image (40); and then
  b. a matching module (11) of the recognition software (10) analyzes the information (41) of the image (40) and judges which application program (20) is suitable to open the information (41);
  c. the application program (20) is called and executed by the recognition software (10) used to make the information (41) to be accessed and set to and displayed on the customer premise equipment (30), and
  d. the application program (20) will catch a key held in the information (41) to add at least a corresponding new function (25) into the application program (20) after step c.

2. The application program execution method according to claim 1 wherein the application program (20) can be multimedia viewer software, network application software, entertainment software or productivity software.

3. The application program execution method according to claim 1 wherein the customer premise equipment (30) can be each of devices such as cell phone, tablet personal computer, laptop computer, and wrist watch.

4. The application program execution method according to claim 1 wherein the customer premise equipment (30) comprises at least a lens (31).

5. The application program execution method according to claim 1 wherein the application program (20) will catch an account setting held in the information (41) to link a server (50) via Internet and obtain video information (52) after Step c.

6. The application program execution method according to claim 1 wherein the application program (20) will catch an account setting held in the information (41) to link a server (50) via Internet and obtain a file list (51) after Step c.

7. The application program execution method according to claim 5 wherein the application program (20) comprises an account management module (21).

8. The application program execution method according to claim 6 wherein the application program (20) comprises an account management module (21).

9. The application program execution method according to claim 5 wherein the application program (20) comprises a user interface (22) and a synchronizing module (23).

10. The application program execution method according to claim 6 wherein the application program (20) comprises a user interface (22) and a synchronizing module (23).

11. The application program execution method according to claim 6 wherein the application program (20) comprises an off-line module (24).

\* \* \* \* \*